Patented Aug. 28, 1945

2,383,818

UNITED STATES PATENT OFFICE 2,383,818

PREPARATION OF ORGANOSILICON HALIDES

Eugene G. Rochow and William F. Gilliam, Schenectady, N. Y., assignors to General Electric Company, a corporation of New York No Drawing. Application July 26, 1943, Serial No. 496,186

14 Claims. (Cl. 260—607)

This invention relates to contact masses comprising silicon and an oxide of copper and to the use of such masses in the preparation of organosilicon halides from hydrocarbon halides. It is particularly concerned with the production of friable, oxidized alloys of silicon and copper especially adapted to be employed in effecting reaction between the silicon component of the oxidized alloy and a hydrocarbon halide in liquid or vapor state.

The copending application of Eugene G. Rochow, Serial No. 412,459, filed September 26, 1941, discloses and claims a method of preparing organosilicon halides, more particularly hydrocarbon-substituted silicon halides, which comprises effecting reaction between silicon and a hydrocarbon halide in the presence or absence of a metallic catalyst. If a catalyst is employed, it may be in the form of a finely-divided powder intimately associated with the silicon or in the form of an alloy of the catalyst metal with the silicon. The copending application of Eugene G. Rochow and Winton I. Patnode, Serial No. 412,460, filed September 26, 1941, describes and claims a method of preparing hydrocarbon-substituted silicon halides, e. g., methyl silicon chlorides, wherein is utilized a solid, porous contact mass of the kind disclosed and claimed in the copending application of Winton I. Patnode, Serial No. 412,461, filed September 26, 1941. These solid, porous contact masses preferably are obtained by firing under reducing conditions a molded mixture of silicon and a powdered metallic catalyst for the reaction between silicon and a hydrocarbon halide. All of the above-mentioned applications are assigned to the same assignee as the present invention.

The present invention differs from those claimed in the above-identified applications in that the organosilicon halides are produced by reaction of a hydrocarbon halide with the silicon component of a contact mass comprising silicon and, as a catalyst for the reaction, an oxide of copper. The contact mass may comprise either a mixture of powdered silicon and an oxide of copper or an alloy of silicon and copper which has been exposed to air or some other oxidizing atmosphere for a period of time at least sufficient to oxidize the copper-containing phase or phases of the alloy, a condition readily recognized by the fact that the intergranular oxidation greatly lessens the cohesion of the cast mass, rendering it easily pulverizable. The specific reactions involved and the compounds formed during the conversion of such alloys to a friable state are not fully known or understood. However, from a comparison of the treated alloys with the silicon-copper oxide mixtures in their reactions with hydrocarbon halides to form organosilicon halides, we are led to believe that the reactions involved when the alloys are exposed to an oxidizing atmosphere include at least a partial oxidization of the copper and that the resultant oxides are present in the friable product. Both the silicon-copper oxide mixtures and the oxygen-treated, i. e., oxidized, alloys are very reactive with hydrocarbon halides. Larger yields of organo-silicon halides, for example, phenyl silicon halides, have consistently been obtained by employing an oxidized alloy in place of the fresh alloy.

The hydrocarbon halides used in the preparation of organosilicon halides in accordance with the present invention are the alkyl-, aryl-, aralkyl- and alkaryl-halides, particularly the chlorides and bromides. Any of these compounds when brought into intimate contact with the heated contact masses of our invention react with the silicon component thereof to form a mixture comprising the corresponding hydrocarbon-substituted silicon halides. During the reaction, some of the oxides of copper possibly undergo a partial reduction in view of the fact that some water is present in the products of reaction first to be formed when the hydrocarbon halide is passed over the heated contact mass. However, the formation of water ceases within a short time and microscopic examination of the powder after prolonged exposure to methyl chloride at the reaction temperatures has shown little or no free copper in the mixture.

The contact masses consisting essentially of mixtures of silicon and a copper oxide are ordinarily prepared by thoroughly mixing the two powdered components in suitable proportions. The resultant powder may be used as such or may be pressed into pellets or granules of suitable size and shape, depending on the design of the reactor in which they are to be used. The pelleted or granular masses sometimes are preferred in reactors where less resistance to the passage of the hydrocarbon halides is particularly desirable.

The contact masses consisting essentially of the oxidized alloys are ordinarily employed in the granular state and are prepared by subjecting a suitable copper-silicon alloy to an oxidizing atmosphere for a period of time at least sufficient to convert the alloy from a hard, brittle state to a state where it is sufficiently friable to be easily crushed between the fingers. For best results the friable alloy, preferably in the disintegrated state, is subjected to further oxidation to obtain maximum reactivity thereof with the hydrocarbon halides. This oxidation treatment may be accomplished by exposing the alloy to air or to any other oxygenous atmosphere at room temperature or at elevated temperatures. As the oxidation or aging at room temperature requires long periods of time measured in months or years, we prefer to carry out the conversion at elevated temperatures, for example at temperatures in the neighborhood of 100 degrees to 350 degrees C. At such elevated temperatures, the conversion of the alloy to a friable state is substantially completed in from one to two days, after which the friable material is preferably subjected to further heating at these temperatures in an oxidizing atmosphere, for example for from 5 to 30 hours.

In order that those skilled in the art better may understand how the present invention may be carried into effect, the following illustrative examples are given:

Example 1

A hard, brittle commercial 50 per cent copper-silicon alloy was heated in an oven to 155 degrees C. for 20 hours. At the end of this time the alloy was sufficiently friable to be broken up easily and packed into a glass reaction tube. The material was then further oxidized in the tube by passing a slow stream of air through the tube for 21 hours at temperatures between 50 and 270 degrees C. The air stream was shut off and chloro-benzene was allowed to vaporize into the tube with the contact mass held at a temperature of 420 degrees C. The reaction products issuing from the tube were found to contain about five times as much phenyl silicon chlorides as did similar reaction products obtained by use of the original unoxidized alloy.

Example 2

Some fresh 50 per cent silicon-copper alloy was reduced to small lumps in a jaw crusher and placed in an air-circulating oven for 20 hours at 155 degrees C. The resultant product then was pulverized. A glass reaction tube was charged with the pulverized material and the vapor of monochlorobenzene passed through the charge heated to a temperature of 420 degrees C. The first reaction product contained about 7 per cent of phenyl-silicon chlorides. The contact mass was then further oxidized for 16½ hours at 305 to 340 degrees C. by passing air through the mass in the reaction tube. Monochlorobenzene was again passed through the tube. The products of reaction were found to contain about 20 per cent phenyl silicon chlorides. These results show the pronounced effect of the oxidation treatment on the reactivity of the silicon-copper alloys and indicate that maximum reactivity of the alloy is obtained by continuing the oxidation treatment beyond the point where the original alloy is first converted to a friable state.

Example 3

The catalytic effect of the oxides of copper on the reaction with heated silicon of hydrocarbon halides, specifically methyl chloride, is shown by the following examples:

(A) A glass reaction tube was charged with pressed powdered commercial silicon. The charge was heated to a temperature of 300 degrees C. and methyl chloride passed over the heated charge at the rate of 2.25 g. per hr. Methyl chlorosilanes (methyl silicon chlorides) were formed at the rate of 1.31 g. per hr. at first, but this rate decreased with time. When the reaction had almost ceased, about 3.7 per cent of the silicon had been consumed at an overall rate of 0.142 gram per hour.

(B) The same glass tube as was used in part (A) was charged with pellets prepared from a ball-milled mixture of 10 parts cuprous oxide with 90 parts silicon. The contact mass was heated to a temperature of 300 degrees C. and methyl chloride passed through the heated mass at the rate of 2.25 g. per hour. Methyl silicon chlorides were formed at the rate of 2.25 grams per hour.

(C) Cupric oxide was substituted for the cuprous oxide employed in part (B). Employing the same reaction temperature and rate of flow of methyl chloride, methyl silicon chlorides were produced at the rate of 3.87 gms./hr.

It will be understood, of course, by those skilled in the art that our invention is not limited to the specific hydrocarbon halides named in the above illustrative examples and that any other hydrocarbon halides may be employed as reactants with the silicon, the conditions of reaction generally being varied, depending upon the particular starting hydrocarbon halide and the particular end-products desired to be obtained.

Likewise the invention is not limited to the specific reaction temperatures or temperature ranges mentioned in the examples. However, the reaction temperature should not be so high as to cause an excessive deposition of carbon upon the unreacted silicon during the reaction. In general, the reaction temperature to be used will vary with, for example, the particular hydrocarbon halide employed, the particular oxidized catalyst used and the yields of the specific reaction products desired to be obtained from a particular starting hydrocarbon halide. For example, by varying the temperature of reaction within the temperature range of, say, 200° to 500° C., the proportions of the individual products obtained when the hydrocarbon halide is brought into contact with the contact mass can be varied, and also, the overall rate of reaction. At temperatures of about 200° C. the reaction proceeds much more slowly than at reaction temperatures around 250° to 400° C. At temperatures much above 400° C., in the case of methyl chloride for example, there is a vigorous exothermic reaction which generally results in an undesirable deposition of carbon on the contact mass, thereby lessening its efficiency.

The oxide contact masses used in the practice of this invention may also be prepared from copper salts such as the nitrates which are readily converted to oxide. Ordinarily the copper oxide may comprise from 5 to 60 per cent of the contact mass. We prefer to employ masses containing from 10 to 50 per cent by weight of oxide or those prepared by oxidizing silicon-copper alloys containing from 10 to 50 per cent copper.

The present invention provides a new and improved method for the production of alkyl silicon halides (e. g., methyl, ethyl, propyl, butyl, amyl, isoamyl, hexyl, etc., silicon halides), the aryl silicon halides (e. g., phenyl silicon halides, etc.), the aryl-substituted aliphatic silicon halides (e. g., phenylethyl silicon halides, etc.) and the aliphatic-substituted aryl silicon halides (e. g., tolyl silicon halides, etc.).

The products of this invention have utility as intermediates in the preparation of other products. For instance, they may be employed as starting materials for the manufacture of silicone resins. They also may be used as agents for treating water-non-repellent bodies to make them water-repellent as disclosed and claimed in Winton I. Patnode Patent No. 2,306,222, assigned to the same assignee as the present invention. They also may be employed for treating glass fibers in continuous filament or other form.

What we claim as new and desire to secure by Letters Patent of the United States is:

1. The method which comprises effecting reaction between a hydrocarbon halide and the silicon component of a contact mass comprising silicon and an oxide of copper.

2. The method of preparing organosilicon halides which comprises effecting reaction between a hydrocarbon halide and a friable, oxidized alloy of silicon and copper obtained by subjecting the alloy to an oxidizing atmosphere at a temperature not exceeding about 350° C., the said hydrocarbon halide being selected from the group consisting of alkyl, aryl, alkaryl, and aralkyl halides.

3. The method of preparing alkyl silicon halides which comprises effecting reaction between an alkyl halide and the silicon component of a contact mass consisting of a mixture of powdered silicon and a copper oxide.

4. The method of preparing aryl silicon halides which comprises effecting reaction between an aryl halide and the silicon component of a contact mass obtained by subjecting an alloy of silicon and copper containing from 10 to 50 per cent copper to an oxidizing atmosphere at a temperature not exceeding about 350° C. until the alloy is converted to at least a friable state.

5. The method of preparing phenyl silicon halides which comprises effecting reaction between mono-halogenated benzene and the silicon component of a contact mass obtained by oxidizing a 50-50 alloy of silicon and copper by contacting said alloy with an oxidizing atmosphere at a temperature in the neighborhood of from 100 to 350° C. until the alloy is converted at least to a friable state.

6. The method of preparing aryl silicon halides which comprises effecting reaction between an aryl halide in the vapor state and the silicon component of a contact mass consisting of an oxidized alloy of equal parts by weight of silicon and copper obtained by heating said alloy to a temperature of from 100 to 350° C. in an oxidizing atmosphere for a period of time sufficient to convert the alloy to at least a friable state.

7. The method of preparing aryl silicon chlorides which comprises effecting reaction between an aryl chloride in a vapor state and the silicon component of a contact mass obtained by heating a 50-50 copper-silicon alloy in air for at least 20 hours at a temperature of 155° C.

8. The method of preparing methyl silicon halides which comprises effecting reaction between a methyl halide and the silicon component of a partially oxidized silicon-copper alloy obtained by heating said alloy to a temperature not exceeding about 350° C. for a period of time sufficient to convert the alloy to at least a friable state.

9. The method of producing a contact mass adapted to be used in effecting chemical reaction between silicon and a hydrocarbon halide which comprises oxidizing an alloy of silicon and copper at a temperature not exceeding about 350° C. to at least a friable state.

10. The method of producing a contact mass adapted to be used in effecting chemical reaction between silicon and an aryl halide which comprises contacting an alloy of silicon and copper with an oxidizing atmosphere at a temperature not exceeding about 350° C. for a period of time sufficient to convert said alloy to a friable state, crushing the friable alloy to a finely-divided state and subjecting the finely-divided material to further oxidation at an elevated temperature not exceeding about 350° C.

11. The method as in claim 10 wherein the finely-divided, friable alloy is subjected to further oxidation for from 5 to 30 hours at a temperature between 100 and 350 degrees C.

12. A contact mass adapted to be used in effecting chemical reaction consisting of silicon and an oxide of copper as essential ingredients.

13. A contact mass adapted to be used in effecting chemical reaction between silicon and a hydrocarbon halide, said mass consisting of an oxidized copper-silicon alloy obtained by contacting said alloy with an oxidizing atmosphere at a temperature not exceeding about 350° C., the said alloy being oxidized to at least a friable state.

14. A finely-divided contact mass adapted to be used in effecting chemical reaction between silicon and an aryl halide, said mass consisting of an oxidized, friable, silicon-copper alloy containing from 10 to 50 per cent copper, the said oxidized alloy being obtained by heating the silicon-copper alloy to a temperature in the neighborhood of from 100 to 350° C.

EUGENE G. ROCHOW.
WILLIAM F. GILLIAM.